United States Patent
Mizuno et al.

(10) Patent No.: US 8,005,343 B2
(45) Date of Patent: Aug. 23, 2011

(54) RECORDING/PLAYBACK DEVICE, RECORDING/PLAYBACK METHOD AND DIGITAL BROADCAST VIEWING HISTORY RECORDING SYSTEM

(75) Inventors: Hiroyuki Mizuno, Kanagawa (JP); Nobuhiro Ono, Kanagawa (JP); Kazunari Sumiyoshi, Kanagawa (JP); Makoto Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1131 days.

(21) Appl. No.: 11/749,830

(22) Filed: May 17, 2007

(65) Prior Publication Data

US 2007/0269184 A1    Nov. 22, 2007

(30) Foreign Application Priority Data

May 17, 2006   (JP) ................................ 2006-138290

(51) Int. Cl.
*H04N 9/80* (2006.01)
(52) U.S. Cl. ...................................... 386/241; 386/281
(58) Field of Classification Search .................. 386/200, 386/241, 248, 278
See application file for complete search history.

(56) References Cited

U.S. PATENT DOCUMENTS

| | | | | |
|---|---|---|---|---|
| 5,546,191 | A * | 8/1996 | Hibi et al. | 386/291 |
| 5,974,218 | A * | 10/1999 | Nagasaka et al. | 386/200 |
| 6,990,498 | B2 | 1/2006 | Fenton et al. | |
| 2003/0220838 | A1 | 11/2003 | Ishii et al. | |
| 2004/0040041 | A1* | 2/2004 | Crawford | 725/88 |
| 2004/0073950 | A1* | 4/2004 | Tan et al. | 725/135 |
| 2005/0259957 | A1 | 11/2005 | Jung et al. | |

FOREIGN PATENT DOCUMENTS

JP     2003-061036     2/2003

* cited by examiner

*Primary Examiner* — Huy T Nguyen
(74) *Attorney, Agent, or Firm* — Turocy & Watson, LLP

(57) ABSTRACT

A recorded data storing unit previously stores recorded content data. An index information storing unit stores index information corresponding to portions being grouped depending on attributes of the recorded content from the outside. A playlist creating unit creates a playlist presenting editing targets for the attributes according to specified information specified by a user for the attributes using the specified information and index information appended to the portions of the recorded content depending on the attributes. A playlist storing unit stores the playlist created by the playlist creating unit. A content editing unit edits the editing targets in recorded content in the recorded data storing unit according to the index information in the index information storing unit and the playlist in the playlist storing unit.

10 Claims, 7 Drawing Sheets

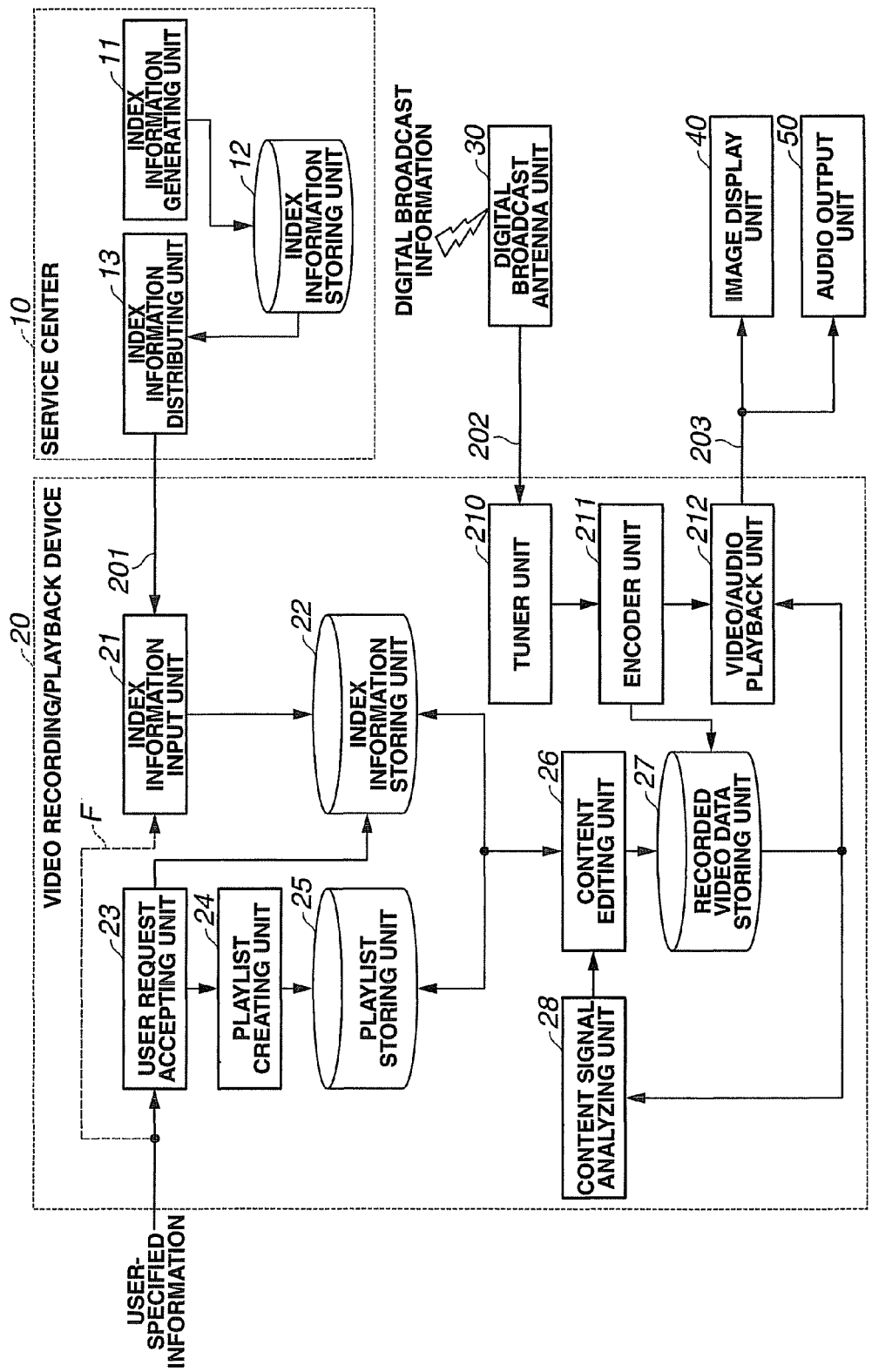

FIG.2A

INDEX INFORMATION ID: 20050830ABC
CONTENT ID: 000111111

| STARTING TIME | STARTING INDEX NUMBER | ATTRIBUTE INFORMATION |
|---|---|---|
| 10:00:00 | 1 | PROGRAM CONTENT 1 |
| 10:03:45 | 16 | CM1 |
| 10:05:00 | 21 | PROGRAM CONTENT 2 |
| 10:08:30 | 35 | CM2 |
| 10:09:45 | 40 | TRAILER |
| 10:11:00 | 45 | CM3 |
| ... | ... | ... |

FIG.2B

INDEX INFORMATION ID: 20050830DEF
CONTENT ID: 000111112

| STARTING TIME | STARTING INDEX NUMBER | ATTRIBUTE INFORMATION |
|---|---|---|
| 21:00:00 | 1 | FIRST HALF 1 |
| 21:22:45 | 92 | GOAL SCENE (JAPAN'S NATIONAL TEAM) |
| 21:23:15 | 94 | FIRST HALF 2 |
| 21:46:30 | 187 | CM1 |
| 22:01:45 | 248 | SECOND HALF 1 |
| 22:44:00 | 415 | GOAL SCENE (BRAZIL'S NATIONAL TEAM) |
| 22:44:30 | 417 | SECOND HALF 2 |
| 22:49:30 | 437 | CM2 |
| ... | ... | ... |

FIG.3A

PLAYLIST ID: A0001

| INDEX INFORMATION ID | 20050830ABC |
|---|---|
| CONTENT ID | 000111111 |
| PROGRAM CONTENT 1 | PLAY 1 |
| CM1 | DELETION |
| PROGRAM CONTENT 2 | PLAY 2 |
| CM2 | DELETION |
| TRAILER | PLAY 3 |
| CM3 | DELETION |

FIG.3B

PLAYLIST ID: A0002

| INDEX INFORMATION ID | 20050830DEF |
|---|---|
| CONTENT ID | 000111112 |
| FIRST HALF 1 | DELETION |
| GOAL SCENE (JAPAN'S NATIONAL TEAM) | PLAY 1 |
| FIRST HALF 2 | DELETION |
| CM1 | DELETION |
| SECOND HALF 1 | DELETION |
| GOAL SCENE (BRAZIL'S NATIONAL TEAM) | PLAY 2 |
| SECOND HALF 2 | DELETION |
| CM2 | DELETION | even in copy-inhibited data without using copy processing.

RECORDING/PLAYBACK DEVICE, RECORDING/PLAYBACK METHOD AND DIGITAL BROADCAST VIEWING HISTORY RECORDING SYSTEM

CROSS-REFERENCE TO RELATED APPLICATIONS

This application is based upon and claims the benefit of priority from the prior Japanese Patent Application No. 2006-138290 filed on May 17, 2006; the entire contents of which are incorporated herein by reference.

BACKGROUND OF THE INVENTION

1. Field of the Invention

The present invention relates to a recording/playback device, a recording/playback method and a digital broadcast viewing history recording system configured to allow for deleting unneeded portions contained even in copy-inhibited data without using copy processing.

2. Description of Related Art

In recent years, as the digital broadcast spreads, the demands have been increased for improved convenience of recording digital video content. It would be more convenient if a user can retain only needed portions of recorded digital content or delete the other portions, for example. With the improved convenience, a user can reduce unnecessary viewing time, as well as the capacity of a recording medium can be conserved. However, there are the following problems in realizing such convenience.

A first problem is in that digital content must be edited without using copy processing.

Digital content which is recorded by a recorder using an optical recording medium such as an HDD or a DVD and includes copy control for copyright protection can be moved, but not be copied, from a recording medium or device to another.

The copy control for copyright protection includes copy control by which a received digital broadcast signal can be recorded by digital recording equipment only once as in digital terrestrial broadcast. In that case, the recorded digital broadcast signal cannot be dubbed (copied) to other digital recording equipment. When recording equipment having a moving function is used, once content is moved from a recording medium or device to another, the content is deleted from the source recording medium. For example, a TV program recorded on an HDD can be moved onto a DVD, then the TV program is deleted from the HDD.

Typically, when recorded digital content is edited, for example unneeded data such as a commercial message (CM) is edited out of the content, information of positions dividing the content is recorded and a playlist containing data of portions to be played back of the content is created based on the information of division.

A playlist contains only information listing positions to start playback, hence not the content itself. If a user desires to create content data that can be played back similarly to the portions to be played back listed in the created playlist, it is necessary to create replicated data by copying content data referenced by the playlist based on the playlist.

A second problem is in that if a user desires to decide unneeded portions of recorded video content, the user needs to know in advance where and what details are recorded in the content.

In order to decide unneeded portions of content, a user may view the details of the content actually for confirmation. However, this approach leads to viewing the content thoroughly, therefore being a time-consuming and labor-intensive task. The producing of the division information by editing out CMs, for example, can be realized by detecting a change in a video signal, an acoustic signal and the like or by detecting a silent portion. However, this approach does not ensure that a user can specify desired division points. Further difficulty is in that different users add division information to different positions. Furthermore, since the producing of only the division information cannot make the purpose of the division clear, it is difficult to utilize the division information effectively afterward.

Prior arts relating to the deletion of unneeded data include the Japanese Patent Laid-Open No. 2003-61036, for example. According to that patent document, specifically to FIG. 1 therein, in the relation between a service center and a user subscribing to the center in a pre-determined manner, encrypted index information supplied from the service center is received by a user's TV program recording/playback device, a received encrypted signal is decoded by an index information decoder to produce index information, and the produced index information is displayed on a display device for presentation to the user. The document further describes that based on the displayed details, the user specifies a playback method for a TV program signal from which a broadcast wave is received and recorded by a user operation; and according to the specified playback method, the TV program recording/playback device operates such as to skip, for example CMs in a recorded TV program to play back program content, or to cue a pre-determined position in the program content to start playback from that position.

The method proposed by the prior art realizes playback according to a user-specified playlist (playback list). The method just retains the original recorded video content recorded by the user's TV program recording/playback device and performs the playback and display by skipping unneeded portions. That is, the method does not delete CMs from a recording medium to conserve the capacity of the recording medium.

BRIEF SUMMARY OF THE INVENTION

According to one aspect of the present invention, a recording/playback device is provided that includes: a recorded data storing unit configured to previously store recorded content; an index information storing unit configured to store index information corresponding to portions being grouped depending on attributes of the recorded content supplied from the outside; a playlist creating unit configured to create a playlist presenting editing targets for the attributes according to specified information specified by a user for the attributes using the specified information and the index information appended to the portions of the recorded content depending on the attributes; a playlist storing unit configured to store the playlist created by the playlist creating unit; and a content editing unit configured to edit portions equivalent to the editing targets in the recorded content being recorded in the recorded data storing unit according to the index information stored in the index information storing unit and the playlist stored in the playlist storing unit.

According to another aspect of the present invention, a recording/playback method is provided that includes: previously storing recorded content in a recorded data storing unit; storing index information in an index information storing unit, in which the index information corresponds to portions being grouped depending on attributes of the recorded content supplied from the outside; creating a playlist presenting editing targets for the attributes according to specified information specified by a user for the attributes using the specified information and index information appended to the portions of the recorded content depending on the attributes; storing the created playlist in a playlist storing unit; and editing portions equivalent to the editing targets in the recorded content being recorded in the recorded data storing unit according to the index information stored in the index information storing unit and the playlist stored in the playlist storing unit.

According to still another aspect of the present invention, a digital broadcast viewing history recording system is provided that includes: a service center configured to distribute index information;

a digital broadcast antenna unit configured to receive a digital broadcast signal as digital broadcast information;

a recording/playback device having functions of compressing and saving the digital broadcast signal received by the digital broadcast antenna unit as well as editing the saved digital content using the index information, the recording/playback device including: a recorded data storing unit configured to previously store recorded content; an index information storing unit configured to store index information corresponding to portions being grouped depending on attributes of the recorded content supplied from the outside; a playlist creating unit configured to create a playlist presenting editing targets for the attributes according to specified information specified by a user for the attributes using the specified information and index information appended to the portions of the recorded content depending on the attributes; a playlist storing unit configured to store the playlist created by the playlist creating unit; and a content editing unit configured to edit portions equivalent to the editing targets in the recorded content being recorded in the recorded data storing unit according to the index information stored in the index information storing unit and the playlist stored in the playlist storing unit; and an image display unit and an audio output unit configured to, respectively, output video and audio played back by the recording/playback device.

BRIEF DESCRIPTION OF THE DRAWINGS

FIG. 1 is a block diagram illustrating a digital broadcast viewing history recording system in which a video recording/playback device according to the present invention is applied;

FIG. 2A is a diagram showing an example of index information used in the video recording/playback device in the system in FIG. 1;

FIG. 2B is a diagram showing another example of index information used in the video recording/playback device in the system in FIG. 1;

FIG. 3A is a diagram showing an example of a playlist used in the video recording/playback device in the system in FIG. 1;

FIG. 3B is a diagram showing another example of a playlist used in the video recording/playback device in the system in FIG. 1;

DETAILED DESCRIPTION OF THE INVENTION

Figure 4A:
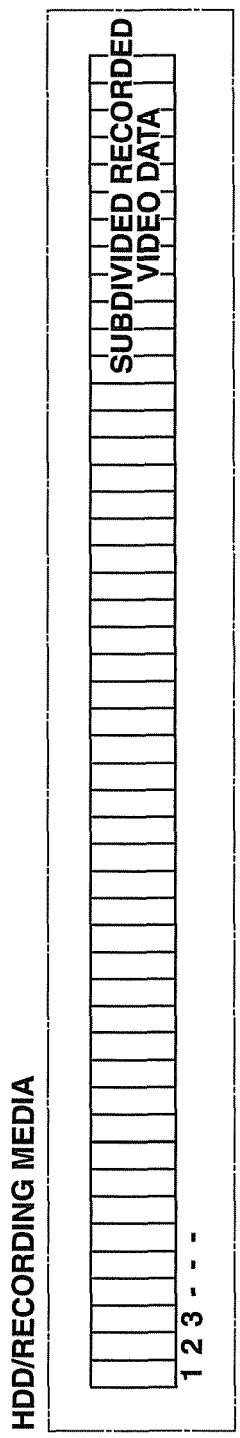
FIGS. 4A to 4C are diagrams illustrating the operation of a video recording/playback device according to a first embodiment of the present invention.

Embodiments of the present invention will be described with reference to the drawings.

According to the embodiments of the present invention, for copy-inhibited digital content, for example, a user can present index information (for example, information of content separations for needed/unneeded portions) of recorded digital content without actually viewing its content details, such that the user can delete the unneeded portions from the content automatically by specifying the unneeded portions. The unneeded portions do not look to be edited out by simply being skipped while the user views the content, but the unneeded portions are actually deleted from the content without using the copy processing. Alternatively, only the needed portions can be extracted from the recorded video content as recorded content without using the copy processing.

FIG. 1 is a block diagram illustrating a digital broadcast viewing history recording system in which a video recording/playback device as the video recording/playback device according to the present invention is applied. FIG. 2 shows examples of index information used in the video recording/playback device in the system in FIG. 1, and FIG. 3 shows examples of a playlist used in the video recording/playback device in the system in FIG. 1. The overview of the system according to the present invention will be described with reference to FIGS. 1 to 3.

The digital broadcast viewing history recording system shown in FIG. 1 includes: a service center 10 configured to distribute index information; a digital broadcast antenna unit 30 configured to receive a digital broadcast signal as digital broadcast information; a video recording/playback device 20 having functions of compressing and saving the received digital broadcast signal as well as editing the saved digital content using the index information; and an image display unit 40 and an audio output unit 50 configured to output video and audio played back, respectively.

The service center 10 provides relevant division information for the content being an editing target and attribute information for the division (or, referred to simply as attributes; information indicating, for example, program content, a CM or a certain category of video, in similar meaning to "chapter information" herein). The providing method uses a communication cable 201 such as the Internet connection or a private line for communication between the service center 10 and the user's video recording/playback device 20.

The service center 10 includes an index information generating unit 11, an index information storing unit 12 and an index information distributing unit 13.

The index information generating unit 11 generates the index information indicating division positions depending on an attribute of a broadcasted TV program.

FIGS. 2A and 2B show examples of the index information. FIGS. 2A and 2B show the index information in the cases that the content is a TV drama and that the content is a football program, respectively. A division position is indicated as the starting time and an index position. An index position indicates the starting position of a division position when a unit of time or the number of frames is defined as an index. In this example, an index is defined as 15 seconds.

The index information storing unit 12 is configured as a storage device configured to store the generated index information.

The index information distributing unit 13 uses the communication cable 201 such as the Internet connection or a private line to transmit the index information to the viewer's video recording/playback device 20.

The video recording/playback device 20 being a recording/playback device has functions of viewing and recording digital broadcast. The device 20 further has functions of creating an appropriately edited playlist from index information and user-specified information (for example, information to specify the deletion of CMs and retaining only program content) distributed from the service center, playing back and editing recorded video content as recorded content based on the playlist.

The video recording/playback device 20 includes an index information input unit 21, an index information storing unit 22, a user request accepting unit 23, a playlist creating unit 24, a playlist storing unit 25, a content editing unit 26, a recorded video data storing unit 27 as a recorded data storing unit, a content signal analyzing unit 28, a tuner unit 210, a encoder unit 211 and a video/audio playback unit 212.

The index information input unit 21 receives the index information distributed from the service center 10.

The index information storing unit 22 is configured as a storage device configured to store the index information received by the index information input unit 21.

The user request accepting unit 23 accepts user-specified information in the state that the index information from the index information storing unit 22 is presented to a user. The user-specified information is the information to specify playback targets, deletion targets or the playback order using the index information appended to the content or based on the attribute information. Actually, the image display unit 40 displays the index information for a user to choose playback targets or deletion targets.

The playlist creating unit 24 creates a playlist using the user-specified information accepted by the user request accepting unit 23 and the index information.

FIGS. 3A and 3B shows examples of the playlist. FIGS. 3A and 3B show playlists corresponding to the index information in FIGS. 2A and 2B, respectively.

The playlist storing unit 25 is configured as a storage device configured to store the playlist created by the playlist creating unit 24.

The content editing unit 26 edits recorded video content stored in the recorded video data storing unit 27 according to the playlist stored in the playlist storing unit 25 and the index information stored in the index information storing unit 22. The editing method will be described later with respect to first and second embodiments.

The tuner unit 210 includes a tuning unit configured to tune in to the carrier wave frequency for digital broadcast signals and a demodulating unit configured to extract coded video data and audio data by digital demodulation. The encoder unit 211 includes an MPEG unit configured to compression-code digitally demodulated, coded data according to the MPEG standard. The digital broadcast signals received by the digital broadcast antenna unit 30 are sent to the tuner unit 210 via an antenna cable 202, further encoded into MPEG signals by the encoder unit 211, and stored in the recorded video data storing unit 27.

The video/audio playback unit 212 has a function of decoding digitally demodulated, coded data inputted to the encoder unit 211 or decoding coded data obtained by editing the recorded video content stored in the recorded video data storing unit 27 by the content editing unit 26 to reproduce analog video signals and audio signals for display. The played back analog video signals and audio signals are inputted to the image display unit 40 configured as a display device and the audio output unit 50 configured as a speaker via an AV cable 203 for video display and audio output.

Figure 6:
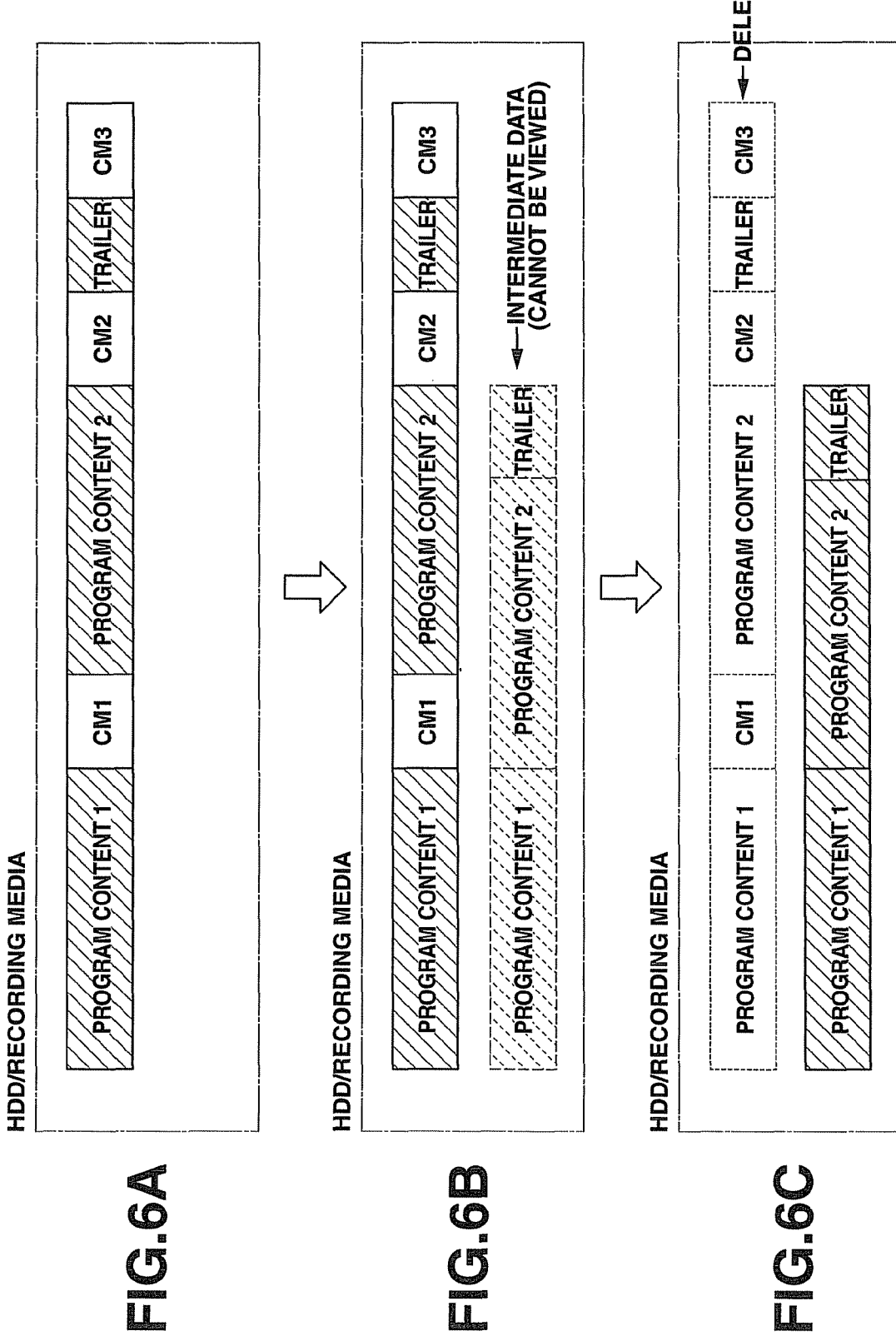
FIGS. 6A to 6C are diagrams illustrating the operation of a video recording/playback device according to a second embodiment of the present invention.

The recorded video data storing unit 27 is configured as a recording medium (denoted as an HDD/recording medium in FIG. 4 or FIG. 6) such as an HDD or a removable DVD, which is configured to store MPEG signals encoded by the encoder unit 211.

The content signal analyzing unit 28 has functions of analyzing broadcast time information, index position information and attribute information of recorded video content stored in the recorded video data storing unit 27 and passing the information to the content editing unit 26. The content editing unit 26 edits, for example deletes, recorded video content stored in the recorded video data storing unit 27 with consideration of a playlist, index information, and the analyzed information from the content signal analyzing unit 28.

In the above configuration, recorded video content is previously inputted from the digital broadcast antenna unit 30 and the tuner unit 210 and stored in the recorded video data storing unit 27. Meanwhile, index information (for example, starting index numbers; see FIGS. 2A and 2B) corresponding to portions being grouped according to attributes of recorded video content in the recorded video data storing unit 27 is inputted from the outside such as the service center 10 and stored in the index information storing unit 22.

The playlist creating unit 24 creates a playlist (see FIGS. 3A and 3B) which presents targets of editing (targets to be edited or not) such as deleting, for the attributes according to specified information, using the specified information that a user specifies for the attributes and index information appended to portions of recorded content based on the attributes. The created playlist is stored in the playlist storing unit 25.

The content editing unit 26 edits, for example deletes, equivalent portions to editing targets in recorded video content being recorded in the recorded video data storing unit 27 according to the index information stored in the index information storing unit 22 and the playlist stored in the playlist storing unit 25. With such edit, the recorded video data storing unit 27 stores recorded video content being edited automatically according to the user specification.

In the above processing, the playlist stored in the playlist storing unit 25 and the index information stored in the index information storing unit 22 are updated along with details edited according to the user specification. The recorded video content can be edited repetitively based on the updated playlist.

If a playlist is present that configures recorded video content, the recorded video content is handled via the playlist. That is, the recorded video content cannot be handled directly in order to maintain the consistency with the playlist. Therefore, the deletion of a playlist means the deletion of recorded video content.

First Embodiment

Figure 4B:
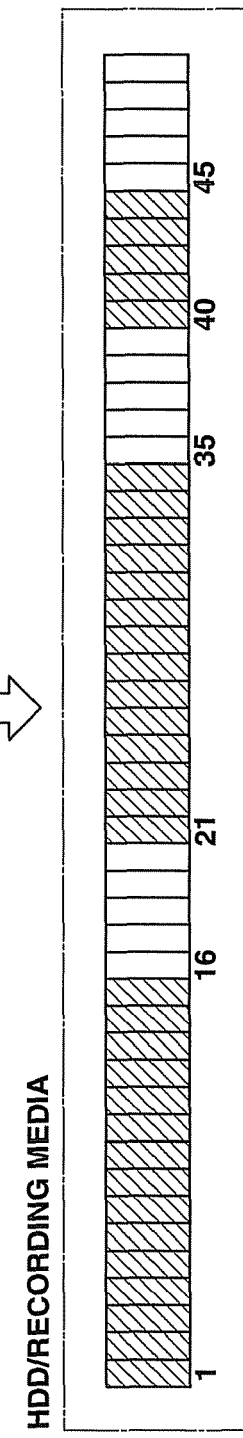

FIGS. 4A and 4B are diagrams illustrating the operation of a video recording/playback device according to a first embodiment of the present invention. The following will describe edit operation by the content editing unit 26 after a playlist is created and stored in the playlist storing unit 25. The description will be made in the case that the recorded video data storing unit 27 is a recording medium such as an HDD or a DVD (HDD/recording medium).

FIGS. 4A and 4B illustrates a method of editing recorded video content by subdividing recorded content instead of using the copy process. The description will use the example in FIG. 2A as index information and the example in FIG. 3A as a playlist.

In FIG. 4A, recorded video content is subdivided into predetermined division units, for example pre-determined time units. Although a time unit is defined as 15 seconds herein, a smaller unit (one second, for example) can be used. The subdivided portions of the recorded video content are numbered with index numbers 1, 2, 3, . . . .

In FIG. 4B, portions being deletion targets (white portions in FIG. 4B) and portions being playback targets (portions indicated by hatching in FIG. 4B) are distinguished by the index numbers according to the index information in FIG. 2A and the playlist in FIG. 3A.

In FIG. 4B, the portions numbered with the index numbers for deletion targets (white portions) are deleted from the recorded video content with distinguished deletion targets in the subdivided recorded video content shown in FIG. 4B. The remaining playback targets (hatching portions) are arranged in the playback order to form new content for playback.

Figure 4C:
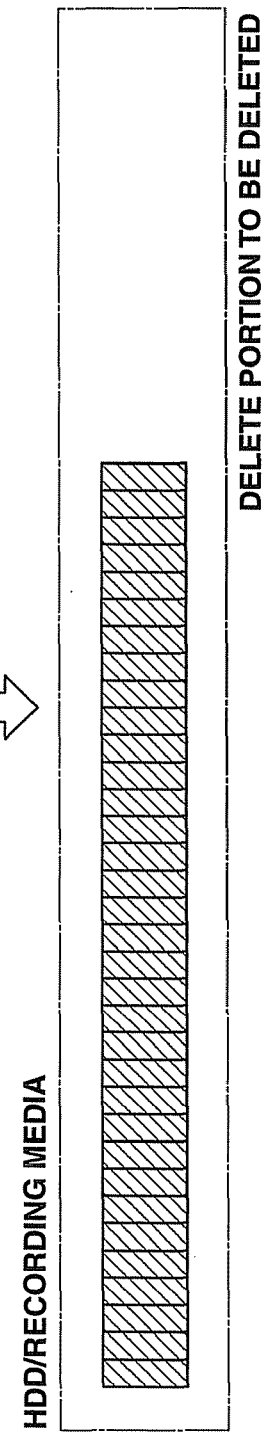
Figure 5:
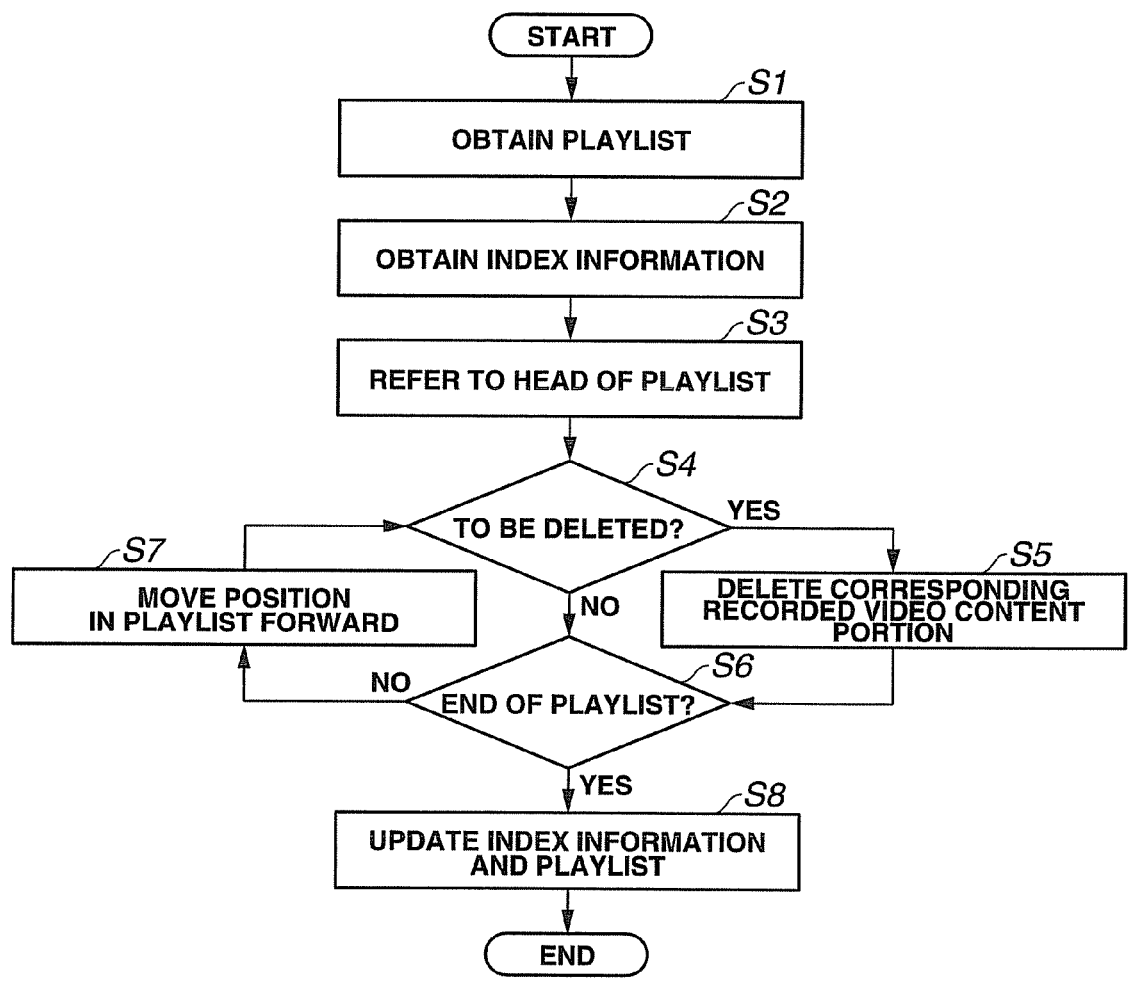
FIG. 5 is a flowchart illustrating the processing in FIGS. 4A to 4C.

FIG. 5 shows a flowchart illustrating the edit processing in FIGS. 4A to 4C.

A playlist in which a user specifies deletion targets (or playback targets) is obtained from the playlist storing unit 25 (step S1). Index information corresponding to the playlist is obtained from the index information storing unit 22 (step S2).

Then, the head of the playlist is referenced (step S3). It is determined whether or not the current pointed list position is a deletion target (step S4).

If the position is not a deletion target at step S4, it is determined whether or not the current pointed playlist position is the end of the list (step S6).

If the position is a deletion target at step S4, the index information is referenced, a portion of recorded video content being a deletion target is deleted from the recorded video data storing unit 27 (step S5), and the processing proceeds to step S6.

If the playlist position is not the end of the list at step S6, the pointed playlist position is moved forward (step S7), and the processing returns to step S4 to repeat steps S4 to S7 until the end of the list is reached. If the playlist position is the end of the list at step S6, the index information and the playlist are updated (step S8), and the processing finishes.

According to the first embodiment, portions of recorded video content are given index information. Because of this, deletion targets can be specified more accurately by narrowing a time interval of the index information, thereby enabling to specify accurate positions of the targets for the deletion.

Although a division unit for subdivision of recorded video content is described as a pre-determined time unit in the above description, the present invention is not limited to the time unit. Instead, the content can be subdivided based on criteria other than time. For example, the content can be subdivided into frame units.

In the above description, the index information of the recorded video content stored in the recorded video data storing unit 27 is inputted from the service center 10 and stored in the index information storing unit 22. The playlist is created by using the index information and the specified information being specified by a user for the attributes. The user-specified information herein is information to specify a playback target or a deletion target for each attribute, for example to specify that CMs should be deleted and only program content should be retained.

However, other than the above mentioned specified information, further specified information is necessary as user-specified information for inputting index information only needed by a user among index information corresponding to multiple recorded video content from the service center 10 stored in the recorded video data storing unit 27 to the index information input unit 21 in the video recording/playback device 20. In that case, the system is configured such that a user can indicate the user-specified information by specifying an ID (or an index information ID) that enables to designate recorded video content to the index information input unit 21 as indicated by the dotted line (the arrow F) in FIG. 1 in order to select index information only corresponding to recorded video content that a user desires to view. With this configuration, index information of desired recorded video content can be obtained from the service center 10, improving the convenience in the actual use.

Second Embodiment

FIGS. 6A to 6C are diagrams illustrating the operation of a video recording/playback device according to a second embodiment of the present invention. The following will describe edit operation by the content editing unit 26 after a playlist is created and stored in the playlist storing unit 25. The description will be made in the case that the recorded video data storing unit 27 is a recording medium such as an HDD or a DVD (HDD/recording medium).

FIGS. 6A to 6C illustrates a method of editing recorded video content by creating intermediate data instead of using the copy process. The description will use the example in FIG. 2A as index information and the example in FIG. 3A as a playlist.

In FIG. 6A, playback target portions and deletion target portions of recorded video content are decided based on the playlist in FIG. 3A and the index information in FIG. 2A. The index information herein is information of time elapsed from the start of the recorded video content. In this processing, divided portions of the recorded video content are decided by considering the index information and broadcast time information analyzed by the content signal analyzing unit 28.

In FIG. 6B, the playback target portions are extracted and arranged in the playback order to create intermediate data. The intermediate data cannot be viewed.

In FIG. 6C, after the intermediate data is created, the referenced recorded video content is deleted. After the referenced recorded video content is deleted, the intermediate data created in FIG. 6B is validated to change the data into new recorded video content that can be viewed.

Figure 7:
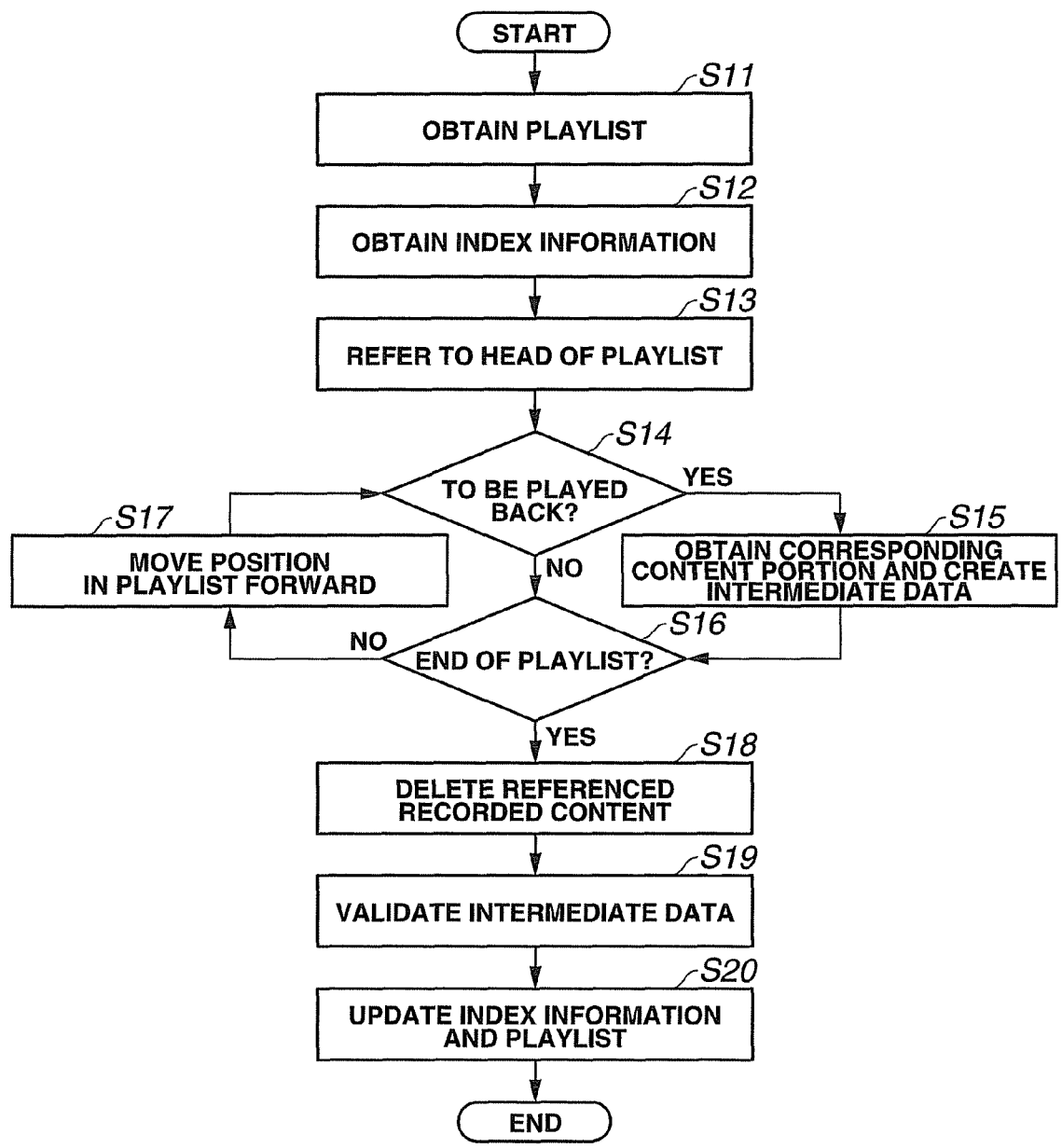
FIG. 7 is a flowchart illustrating the processing in FIGS. 6A to 6C.

FIG. 7 shows a flowchart illustrating the edit processing in FIGS. 6A to 6C.

A playlist in which a user specifies playback targets (or deletion targets) is obtained from the playlist storing unit 25 (step S11). Index information corresponding to the playlist is obtained from the index information storing unit 22 (step S12).

Then, the head of the playlist is referenced (step S13). It is determined whether or not the current pointed list position is a playback target (step S14).

If the position is not a playback target at step S14, it is determined whether or not the current pointed playlist position is the end of the list (step S16).

If the position is a playback target at step S14, index information is referenced, a portion of recorded video content being a playback target is obtained from the recorded video data storing unit 27, intermediate data is created (step S15), and the processing proceeds to step S16.

If the playlist position is not the end of the list at step S16, the pointed playlist position is moved forward (step S17), and the processing returns to step S14 to repeat steps S14 to S17 until the end of the list is reached.

If the playlist position is the end of the list at step S16, the referenced recorded video content is deleted (step S18) and the intermediate data created at step S15 is validated to be viewable (step S19).

Then, the playlist and the index information are updated (step S20).

According to the second embodiment, unlike the method of deleting the deletion targets according to the first embodiment, the playback target portions are decided based on index information, the playback targets to be retained in a recorded video content are extracted to produce intermediate data that cannot be viewed, the original recorded video content is deleted, and the intermediate data is validated to obtain viewable playback content. By this embodiment, unneeded data can be deleted while two productions of viewable content never exist at the same time during the process (in other words, two viewable copies never exist).

According to the above mentioned embodiments of the present invention, recorded video content can be automatically edited in a user-specified way. The user can view only needed portions of the recorded digital video content, realizing time saving. Moreover, the deletion of unneeded portions can conserve the recording capacity of an HDD recording medium as a recorded data storing unit.

It is also possible that even for recorded content including the copy control for the copyright protection can be edited without the copy processing, and a user does not need view and check the content details to create division information of the recorded content.

Although the description in the above mentioned embodiments refers to a case that recorded video content of digital content obtained from such as digital broadcast are partially deleted, the present invention is not limited to that case. Instead, the present invention can apply to a case that recorded analog video content obtained such as from analog broadcast are partially deleted.

Although the description in the embodiments of the present invention also refers to a video recording/playback device configured to record image data, the present invention is not limited to such a device. Instead, the present invention can apply to an audio recording/playback device configured to record and play back audio data. Consequently, the present invention can widely apply to recording/playback devices configured to record and play back image data and/or audio data.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A recording/playback device comprising:
a recorded data storing unit configured to previously store recorded content;
an index information storing unit configured to store index information corresponding to portions being grouped depending on attributes of the recorded content supplied from the outside;
a playlist creating unit configured to create a playlist presenting editing targets for the attributes according to specified information specified by a user for the attributes using the specified information and index information appended to the portions of the recorded content depending on the attributes;
a playlist storing unit configured to store the playlist created by the playlist creating unit; and
a content editing unit configured to edit portions equivalent to deletion targets or playback targets as the editing targets in the recorded content being recorded in the recorded data storing unit and to delete the deletion targets and retain the playback targets according to the index information stored in the index information storing unit and the playlist stored in the playlist storing unit, wherein the content editing unit comprises:
a subdividing unit configured to subdivide the recorded content stored in the recorded data storing unit into pre-determined division units and assign index numbers to subdivided portions;
an identifying unit configured to identify deletion target portions in the recorded content using the index numbers based on the index information stored in the index information storing unit and the playlist stored in the playlist storing unit; and
a deleting unit configured to delete the recorded content portions identified as the deletion target portions based on the index numbers.

2. The recording/playback device according to claim 1 further comprising,
an index information input unit configured to select and input only index information corresponding to user-desired recorded content when index information is inputted from the outside and to supply the information to the index information storing unit.

3. The recording/playback device according to claim 1 wherein:
the recorded content is recorded video content;
the attribute is information indicating whether the portion is a CM or program content in the recorded video content of digital broadcast; and
the specified information is information specifying whether the portion is a playback target or a deletion target.

4. A recording/playback method comprising:
previously storing recorded content in a recorded data storing unit;
storing index information in an index information storing unit, in which the index information corresponds to portions being grouped depending on attributes of the recorded content supplied from the outside;
creating a playlist presenting editing targets for the attributes according to specified information specified by a user for the attributes using the specified information and index information appended to the portions of the recorded content depending on the attributes;
storing the created playlist in a playlist storing unit; and
editing portions equivalent to deletion targets or playback targets as the editing targets in the recorded content being recorded in the recorded data storing unit and deleting the deletion targets and retaining the playback targets according to the index information stored in the index information storing unit and the playlist stored in the playlist storing unit,
wherein the editing comprises:
subdividing the recorded content stored in the recorded data storing unit into pre-determined division units and assigning index numbers to subdivided portions;
identifying deletion target portions in the recorded content using the index numbers based on the index information stored in the index information storing unit and the playlist stored in the playlist storing unit; and deleting the recorded content portions identified as the deletion target portions based on the index numbers.

5. A digital broadcast viewing history recording system comprising:
a service center configured to distribute index information;
a recording/playback device comprising:
  a recorded data storing unit configured to previously store recorded content;
  an index information storing unit configured to store index information corresponding to portions being grouped depending on attributes of the recorded content supplied from the outside;
  a playlist creating unit configured to create a playlist presenting editing targets for the attributes according to specified information specified by a user for the attributes using the specified information and index information appended to the portions of the recorded content depending on the attributes;
  a playlist storing unit configured to store the playlist created by the playlist creating unit; and
  a content editing unit configured to edit portions equivalent to deletion targets or playback targets as the editing targets in the recorded content being recorded in the recorded data storing unit and to delete the deletion targets and retain the playback targets according to the index information stored in the index information storing unit and the playlist stored in the playlist storing unit, wherein the content editing unit comprises: a subdividing unit configured to subdivide the recorded content stored in the recorded data storing unit into pre-determined division units and assign index numbers to subdivided portions; an identifying unit configured to identify deletion target portions in the recorded content using the index numbers based on the index information stored in the index information storing unit and the playlist stored in the playlist storing unit; and a deleting unit configured to delete the recorded content portions identified as the deletion target portions based on the index numbers; and
  an image display unit and an audio output unit configured to, respectively, output video and audio played back by the recording/playback device.

6. A recording/playback device comprising:
a recorded data storing unit configured to previously store recorded content;
an index information storing unit configured to store index information corresponding to portions being grouped depending on attributes of the recorded content supplied from the outside;
a playlist creating unit configured to create a playlist presenting editing targets for the attributes according to specified information specified by a user for the attributes using the specified information and index information appended to the portions of the recorded content depending on the attributes;
a playlist storing unit configured to store the playlist created by the playlist creating unit; and
a content editing unit configured to edit portions equivalent to deletion targets or playback targets as the editing targets in the recorded content being recorded in the recorded data storing unit and to delete the deletion targets and retain the playback targets according to the index information stored in the index information storing unit and the playlist stored in the playlist storing unit, wherein the content editing unit comprises:
  an extracting unit configured to extract the playback targets in the recorded content recorded in the recorded data storing unit to create unreplicable intermediate data, according to the index information stored in the index information storing unit and the playlist stored in the playlist storing unit;
  a deleting unit configured to delete the recorded content previously stored in the recorded data storing unit after creating the intermediate data; and
  a validating unit configured to validate the intermediate data after deleting the recorded content to change the data into viewable data.

7. The recording/playback device according to claim 6, further comprising an index information input unit configured to select and input only index information corresponding to user-desired recorded content when index information is inputted from the outside and to supply the information to the index information storing unit.

8. The recording/playback device according to claim 6, wherein;
the recorded content is recorded video content;
the attribute is information indicating whether the portion is a CM or program content in the recorded video content of digital broadcast; and
the specified information is information specifying whether the portion is a playback target or a deletion target.

9. A recording/playback method comprising:
previously storing recorded content in a recorded data storing unit;
storing index information in an index information storing unit, in which the index information corresponds to portions being grouped depending on attributes of the recorded content supplied from the outside;
creating a playlist presenting editing targets for the attributes according to specified information specified by a user for the attributes using the specified information and index information appended to the portions of the recorded content depending on the attributes;
storing the created playlist in a playlist storing unit; and
editing portions equivalent to deletion targets or playback targets as the editing targets in the recorded content being recorded in the recorded data storing unit and deleting the deletion targets and retaining the playback targets according to the index information stored in the index information storing unit and the playlist stored in the playlist storing unit,
wherein the editing comprises:
extracting the playback targets in the recorded content recorded in the recorded data storing unit to create unreplicable intermediate data, according to the index information stored in the index information storing unit and the playlist stored in the playlist storing unit;
deleting the recorded content previously stored in the recorded data storing unit after creating the intermediate data; and
validating the intermediate data after deleting the recorded content to change the data into viewable data.

10. A digital broadcast viewing history recording system comprising:
a service center configured to distribute index information;
a recording/playback device comprising:
  a recorded data storing unit configured to previously store recorded content;
  an index information storing unit configured to store index information corresponding to portions being grouped depending on attributes of the recorded content supplied from the outside;

a playlist creating unit configured to create a playlist presenting editing targets for the attributes according to specified information specified by a user for the attributes using the specified information and index information appended to the portions of the recorded content depending on the attributes;

a playlist storing unit configured to store the playlist created by the playlist creating unit; and a content editing unit configured to edit portions equivalent to deletion targets or playback targets as the editing targets in the recorded content being recorded in the recorded data storing unit and to delete the deletion targets and retain the playback targets according to the index information stored in the index information storing unit and the playlist stored in the playlist storing unit, wherein the content editing unit comprises: an extracting unit configured to extract the playback targets in the recorded content recorded in the recorded data storing unit to create unreplicable intermediate data, according to the index information stored in the index information storing unit and the playlist stored in the playlist storing unit; a deleting unit configured to delete the recorded content previously stored in the recorded data storing unit after creating the intermediate data; and a validating unit configured to validate the intermediate data after deleting the recorded content to change the data into viewable data; and an image display unit and an audio output unit configured to, respectively, output video and audio played back by the recording/playback device.

* * * * *